Figure 1:
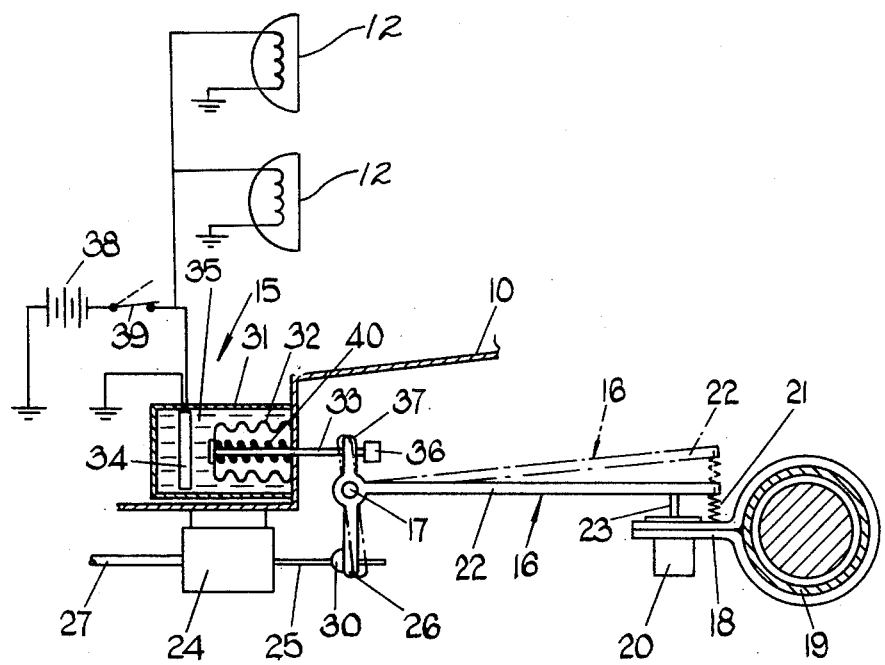

United States Patent [19]

Martin

[11] 4,052,609
[45] Oct. 4, 1977

[54] MOTOR VEHICLE WITH HEADLAMP TILTING MECHANISM

[75] Inventor: Frederick Raymond Patrick Martin, Bromley, England

[73] Assignee: Lucas Electrical Company Limited, Birmingham, England

[21] Appl. No.: 560,879

[22] Filed: Mar. 21, 1975

[30] Foreign Application Priority Data

Mar. 30, 1974 United Kingdom ............... 14218/74

[51] Int. Cl.² ............................................. B60Q 1/10
[52] U.S. Cl. .................................................... 362/71
[58] Field of Search ................. 240/7.1 LJ, 61.1, 61.5, 240/62.6, 62 R

[56] References Cited

U.S. PATENT DOCUMENTS

| | | | |
|---|---|---|---|
| 3,336,470 | 8/1967 | Sombardier | 240/7.1 LJ |
| 3,453,424 | 7/1969 | Cibie | 240/61.1 X |
| 3,868,500 | 2/1975 | Martin | 240/7.1 LJ |
| 3,873,881 | 3/1975 | Inoue | 240/7.1 LJ |

FOREIGN PATENT DOCUMENTS

| | | | |
|---|---|---|---|
| 2,210,989 | 9/1973 | Germany | 240/7.1 LJ |

*Primary Examiner*—L. T. Hix
*Assistant Examiner*—Alan Mathews
*Attorney, Agent, or Firm*—Holman & Stern

[57] ABSTRACT

The motor vehicle comprises a vehicle body suspended on wheels and carrying a pair of headlamps which are mounted on a common cross rod angularly movable relative to the body by means of a headlamp tilting mechanism. The headlamp tilting mechanism is of the hydromechanical type and includes a lever which is mounted on the vehicle body through the intermediary of a pivot. The lever has an arm which is urged by spring into engagement with a temperature sensitive element secured to a rear axle housing of the motor vehicle. An extension projecting from the lever is engaged by an output rod of a mechanism for rendering the tilting mechanism inoperative. The mechanism comprises a body within which is disposed a bellows element having the output rod secured thereto. Also disposed within the body is a temperature expansible material and a heating element which is arranged to be heated when a headlamp filament energizing switch is manually closed. Heating of the temperature expansible material by heating element effects movement of the output rod such that abutment thereon is moved out of engagement with the extension on the lever, thereby permitting the tilting mechanism to operate. When the headlamp energizing switch is de-energized, the temperature expansible material cools down and a spring within the bellows element moves the output rod into a position in which the abutment thereon engages the extension and moves the lever into a position in which the headlamp tilting mechanism is rendered inoperative.

4 Claims, 2 Drawing Figures

MOTOR VEHICLE WITH HEADLAMP TILTING MECHANISM

This invention relates to a motor vehicle with a headlamp tilting mechanism.

According to the present invention, there is provided a motor vehicle including a vehicle body, wheels upon which said vehicle body is mounted, headlamps mounted on the vehicle body for tilting movement, and means for tilting said headlamps, said tilting means including a sensor device having a lever pivotally mounted on a sprung part of the motor vehicle and engaging a member mounted on an unsprung part of the motor vehicle, and manually operable means for moving the lever out of engagement with said member whereby the tilting means can be rendered inoperative when desired.

Preferably, said manually operable means comprises an electrically operated actuator connected with an electrical supply through the intermediary of a manually operable headlamp filament energisation switch, the actuator having an output rod connected with the lever so as to move the latter out of engagement with the said member when the actuator is de-energised.

Conveniently, the actuator comprises a body containing a heat expansible material acting on said rod, and an electrical heating element arranged, when energised, to heat said material so as to move the output rod away from a position in which the output rod has moved the lever out of engagement with said member.

Preferably also, a spring is mounted in the body to oppose resiliently the expansion of the material whereby, when the material body cools, the spring acts on the control rod to effect movement thereof towards said position.

The member may be a temperature sensitive unit, preferably of the type described in our co-pending British Patent application No. 5456/74.

Figure 2:
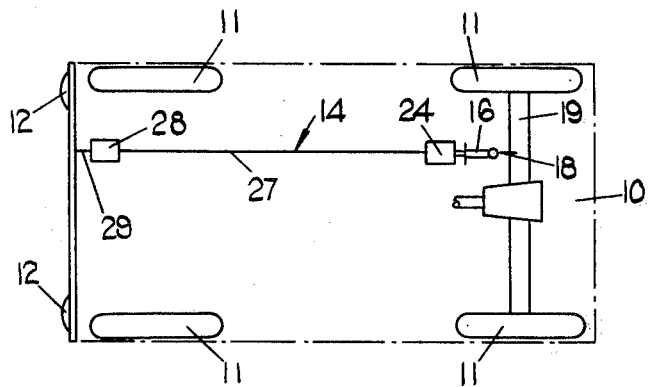

An embodiment of the present invention will now be described, by way of example, with reference to the accompanying drawing, in which:

FIG. 1 is a schematic view of part of a motor vehicle according to the present invention, and FIG. 2 is a schematic plan view of the underside of the motor vehicle of FIG. 1.

the motor vehicle comprises a vehicle body 10 which is suspended on front and rear wheels 11 and which carries a pair of headlamps 12 which are mounted for tilting movement in a vertical plane relative to the body 10 on an angularly movable cross rod 13. The motor vehicle further includes a tilting mechanism indicated very generally by arrow 14, for effecting tilting movement of the headlamps 12.

The tilting mechanism 14, apart from being provided with a device 15 for manually rendering the mechanism 14 inoperative, is virtually identical to the tilting mechanism disclosed in our above mentioned British patent application No. 5456/74. The tilting mechanism comprises a cranked lever 16 which is attached to the body 10 through the intermediary of an horizontal pivot 17, a bracket 18 secured to an axle housing 19 of the motor vehicle, a temperature sensitive unit 20 mounted on the bracket, and a tension spring 21 serving to urge resiliently an arm 22 of the lever 16 against an output rod 23 of the temperature sensitive unit 20.

The tilting mechanism further includes a transducer 24 having an input rod 25 which is slidably engaged in an aperture (not shown) in an arm 26 of the lever 16. The transducer 24 has a hydraulic output connected by means of a conduit 27 with a hydraulic input of a further transducer 18. The further transducer 28 has an output rod 29 connected by means of a lever (not shown) with the cross rod 13. A shock absorbing rubber 30 is interposed between the arm 26 and a shoulder on the input rod 25. A spring (not shown) within the further transducer 28 serves to pressurise hydraulic fluid within conduit 27 and to urge input rod 25 to the right as viewed in FIG. 1. Thus, the spring within further transducer 28 serves to urge cranked lever 16 to move in an anti-clockwise direction about pivot 17. However, this action is opposed by tension spring 21 which is stronger than the spring within further transducer 28 so that, when the tilting mechanism is in operation, the arm 22 of lever 16 is in engagement with output rod 23. The lever 16, unit 20 and bracket 18 define a sensor device which produces an output in the form of a movement of arm 26 of the lever 16 which corresponds to changes in the attitude of the vehicle body 10 relative to the rear wheels 11. Changes in the pressure within conduit 27 are accommodated for by appropriate movements of output rod 23 of unit 20 so that a signal is passed to the further transducer 28 corresponding only to the further transducer 28 corresponding only to the attitude of the vehicle body 10 relative to the rear wheels 11 and is not temperature dependent. The output rod 29 of the further transducer 28 transmits this pressure signal as an angular movement of cross rod 13. The particular manner in which the sensing device operates and in which temperature compensation is effected is described in greater detail in the above mentioned co-pending British patent application No. 5456/74.

The device 15 comprises a body 31 in which is mounted a bellows element 32 carrying an output rod 33 which extends externally of the body 31. A heating element 34 is also mounted within the body 31 and a heat expansible material 35 fills the body 31 around bellows element 32 and heating element 34. A spring 40 within bellows element 32 serves to expand resiliently the latter. The output rod 33, externally of the body 31, passes slidably through an aperture in a lever 37 secured to cranked lever 16. On the opposite side of lever 37 to bellows element 32, the output rod 33 has an abutment 36 thereon. The heating element 34 is arranged to be heated from an electrical source 38 under the control of a manually operable switch 39 which also serves as a headlamp filament energisation switch, (the electrical connections from the switch 39 to the headlamp filaments are not shown in the drawing).

The lever 37 is movable with the cranked lever 16 about pivot 17 and the length of the output rod 33 is such that when the lever 16 has been moved into an extreme clockwise position about pivot 17 by the spring 21, the lever 37 is spaced from abutment 36 when the switch 39 is closed. It will be appreciated that, when the switch 39 is closed, a current is passed through heating element 34 which causes the heat expansible material 35 within body 31 to be heated. Such expansion of material 35 causes contraction of bellows element 32 against the action of spring 40 and movement of the rod 33 to the right as viewed in FIG. 1 so that the abutment 36 lies beyond the extreme clockwise limit of movement of lever 37 about pivot 17.

When the manually operable switch 39 is opened to de-energise the filaments of the headlamps 12, current no longer flows through heating element 34 and so the heat expansible material 35 cools down and thereby contracts. Such contraction of the material 35 relieves the pressure on bellows element 32 which then expand under the action of spring 40. This action moves rod 33 to the left as viewed in FIG. 1 and causes the abutment 36 to contact the lever 37 and move it into the position shown in dotted line FIG. 1. This simultaneously causes the cranked lever 16 to move in an anti-clockwise direction about pivot 17 into the position shown in dotted line in FIG. 1. In this position, the arm 22 lies clear of the output rod 23 of the temperature sensitive unit 20. In order for this to take place, the spring 40 is arranged to be stronger than spring 21. The amount of movement of cranked lever 16 as a result of operation of the device 15 is such that the headlamps are moved into their fully upwardly tilted positions as a result of pressure on input rod 25 via shock absorbing rubber 30 being relieved and the spring within the further transducer 28 causing movement of output rod 29 to the right as viewed in FIG. 2. Full appreciation of the action of the spring within further transducer 28 can be obtained by an examination of our above co-pending British patent application No. 5456/74.

Thus, the headlamp tilting mechanism is rendered inoperative when the headlamp filaments are not energised.

I claim:

1. A motor vehicle including a vehicle body, wheels upon which said vehicle body is mounted, headlamps mounted on said body for tilting movement, and means for tilting said headlamps in response to changes in the attitude of the vehicle body relative to the wheels, said tilting means including a sensor device having a lever pivotally mounted on a sprung part of the motor vehicle and engaging a member mounted on an unsprung part of the motor vehicle, said tilting means also including a transmission for transmitting movements of said lever to said headlamps, continuously so that changes in the attitude of the vehicle body relative to the wheels are transmitted continuously to said headlamps by said transmission, and means connected directly to said lever and disposed, when operated, to move said lever out of engagement with said member whereby said tilting means can be rendered inoperative when desired, said means being manually operable from a remote location.

2. The motor vehicle according to claim 1, wherein said manually operable means comprises an electrically operated actuator connected with an electrical supply through the intermediary of a manually operable switch, said manually operable switch also controlling energisation and de-energisation of filaments of said headlamps, said actuator having an output rod connected with said lever so as to move the latter out of engagement with said member when said actuator is de-energised.

3. The motor vehicle according to claim 2, wherein said actuator comprises a body containing a heat expansible material acting on said output rod, and an electrical heating element arranged, when energised, to heat said material so as to move said output rod away from a position in which said output rod moves said lever out of engagement with said member.

4. The motor vehicle according to claim 3, wherein a spring is mounted in said body of said actuator to oppose resiliently the expansion of said heat expansible material whereby, when said heat expansible material cools, said spring acts on said control rod to effect movement thereof towards said position in which said output rod moves said lever out of engagement with said member.

* * * * *